United States Patent [19]

Blanding et al.

[11] Patent Number: 5,291,217
[45] Date of Patent: Mar. 1, 1994

[54] METHOD AND APPARATUS FOR PRODUCING THERMAL SLIDE TRANSPARENCIES

[75] Inventors: Douglass L. Blanding, Rochester; Steven F. Entz, Hilton; Hugh S. A. Gilmour, Rochester, all of N.Y.

[73] Assignee: Eastman Kodak Company, Rochester, N.Y.

[21] Appl. No.: 529,849

[22] Filed: May 29, 1990

[51] Int. Cl.⁵ .............................................. B41J 2/48
[52] U.S. Cl. ................................................. 346/76 L
[58] Field of Search ............. 346/76 L, 76 PH, 1.1; 358/296; 355/76, 89, 53; 8/471

[56] References Cited

U.S. PATENT DOCUMENTS

| | | | |
|---|---|---|---|
| Re. 32,538 | 11/1987 | Hawkswell | 29/740 |
| 3,409,363 | 11/1968 | Matthaes | 355/87 |
| 4,354,196 | 10/1982 | Newmann et al. | 346/108 |
| 4,469,026 | 9/1984 | Irwin | 346/25 |
| 4,504,186 | 3/1985 | Richards | 414/744 |
| 4,536,772 | 8/1985 | Isogai | 346/76 PH |
| 4,541,042 | 9/1985 | Kohashi | 346/76 PH |
| 4,601,627 | 7/1986 | Oka et al. | 414/225 |
| 4,627,785 | 12/1986 | Monforte | 414/730 |
| 4,710,781 | 12/1987 | Stephenson | 346/76 PH |
| 4,804,975 | 2/1989 | Yip | 346/76 L |
| 4,828,162 | 5/1989 | Donner et al. | 228/6.2 |
| 4,833,124 | 5/1989 | Lum | 503/227 |
| 4,864,418 | 9/1989 | Orikasa et al. | 358/296 |
| 4,910,188 | 3/1990 | Akada et al. | 8/471 X |
| 4,939,541 | 7/1990 | Sugiura | 346/76 PH |
| 4,965,242 | 10/1990 | DeBoer et al. | 430/201 X |

Primary Examiner—Benjamin R. Fuller
Assistant Examiner—David Yockey
Attorney, Agent, or Firm—Robert L. Randall

[57] ABSTRACT

A method and apparatus are disclosed for producing thermal slide transparencies. Receiver elements mounted in open slide frames are positioned on a platen in an exposure station, and donor elements in the form of cut sheets are positioned over the receiver element prior to exposure. A laser beam, modulated in accordance with an information signal, is scanned across the surface of the donor element in order to provide the necessary thermal energy to effect a transfer of dye from a donor element to a receiver element. The elements are moved in a cross-scan direction during exposure by means of a lead screw connected to the platen. In order to form a color slide, successive donor elements of the necessary colors are moved into register with the receiver element. After the image has been formed on the receiver element, the receiver element is moved to a fusing station where the image is fixed. Sections of the slide frame are then joined together to complete the slide.

3 Claims, 2 Drawing Sheets

METHOD AND APPARATUS FOR PRODUCING THERMAL SLIDE TRANSPARENCIES

CROSS REFERENCE TO RELATED APPLICATION

Reference is made to U.S. patent application, Ser. No. 457,593, entitled "Thermal Printer", filed in the name of S. Sarraf on Dec. 27, 1989; this application is assigned to the assignee of the present application.

BACKGROUND OF THE INVENTION

1. Field of the Invention

This invention relates to a method and apparatus for producing thermal slide transparencies, and more particularly, to such a method and apparatus which is particularly suitable for producing color slide transparencies.

2. Description of the Prior Art

In one type of thermal printer, a dye-donor element is placed over a dye-receiving element, and the superposed elements are supported for cooperation with a print head having a plurality of individual heating resistors. When a particular heating resistor is energized, it causes dye from the donor to transfer to the receiver. The density or darkness of the printed color dye is a function of the energy delivered from the heating element to the donor. One of the problems in printers of this type is that the thermal time constant of the resistors is quite long. As a result, the printing speed is relatively slow, and the image contrast is limited.

It is known in thermal printing to use lasers instead of resistors to effect the transfer of dye from a donor element to a receiver element. In U.S. Pat. No. 4,804,975, for example, there is shown thermal dye transfer apparatus which comprises an array of diode lasers which can be selectively actuated to direct radiation onto a dye-carrying donor. Radiation from the diode lasers is modulated in accordance with an information signal to form an image on a thermal print medium. The diode laser array extends the full width of the print medium. A donor element in the form of a web is supported in contact with a receiver element which is mounted on a rotatable drum for movement with the web. When such apparatus is used for making a color image, the donor web must include separate spaced sections, for example, cyan, magenta, and yellow sections, and these sections must successively contact the receiver in separate passes of the drum. One problem in using the continuous web for a donor element is that the supply and take-up rolls make the apparatus rather large and bulky. A further problem is that use of the continuous-web donor limits the flexibility of the apparatus in that it is normally possible to only produce one kind of image, for example, a color image or a black-and-white image.

SUMMARY OF THE INVENTION

It is an object of the present invention to overcome the problems discussed above in the prior art and to provide an improved method and apparatus for use in producing transparencies.

In accordance with one aspect of the invention, there is provided apparatus for producing thermal slide transparencies, the apparatus comprising: means for moving a receiver element into an exposure position at an exposure station, the moving means including means for moving a donor element into register with the receiver element in the exposure position; means for supporting the receiver element and the donor element in the exposure station, the supporting means including a means for moving the elements in a cross scan direction during the exposure thereof; and means for applying heat to the receiver element after the exposure thereof.

In accordance with another aspect of the invention, there is provided a method for producing a thermal slide transparency, the method comprising: placing a receiver element in an exposure station; placing a donor element in register with the receiver element; producing an image on the receiver element by heating successive pixels in the donor element; and removing the donor element from the receiver element.

In one embodiment of the present invention, receiver elements are premounted in open slide frames. A slide frame is positioned on a platen in an exposure station, and a rotatable transfer arm is adapted to move a precut donor element into register with a receiver element at the exposure station. A laser beam is modulated in accordance with an information signal, and a galvonometer scans the modulated beam across the surface of the donor element. The platen supporting the donor and receiver elements is moved in a cross-scan direction by means of a lead screw.

In the event a color image is being produced, the transfer arm successively moves donor elements for each of the necessary colors into contact with the receiver element, and the scan operation is repeated for each element. At the completion of the exposure, the slide frame containing the exposed receiver element is moved to a fusing station where the image is fused. One section Of the slide frame is then folded over onto a section of the frame containing the receiver element, and the two sections are fastened together to complete the slide.

A principal advantage of the present invention is that there is provided a versatile and efficient means for producing thermal slides. A further advantage is that different types of slides can be produced without changing the method or apparatus. Slides which are ready for viewing can be produced in a relatively short time in a dry process.

Other features and advantages will become apparent upon reference to the following description of the preferred embodiment when read in light of the attached drawings.

DESCRIPTION OF THE PREFERRED EMBODIMENT

Figure 1:
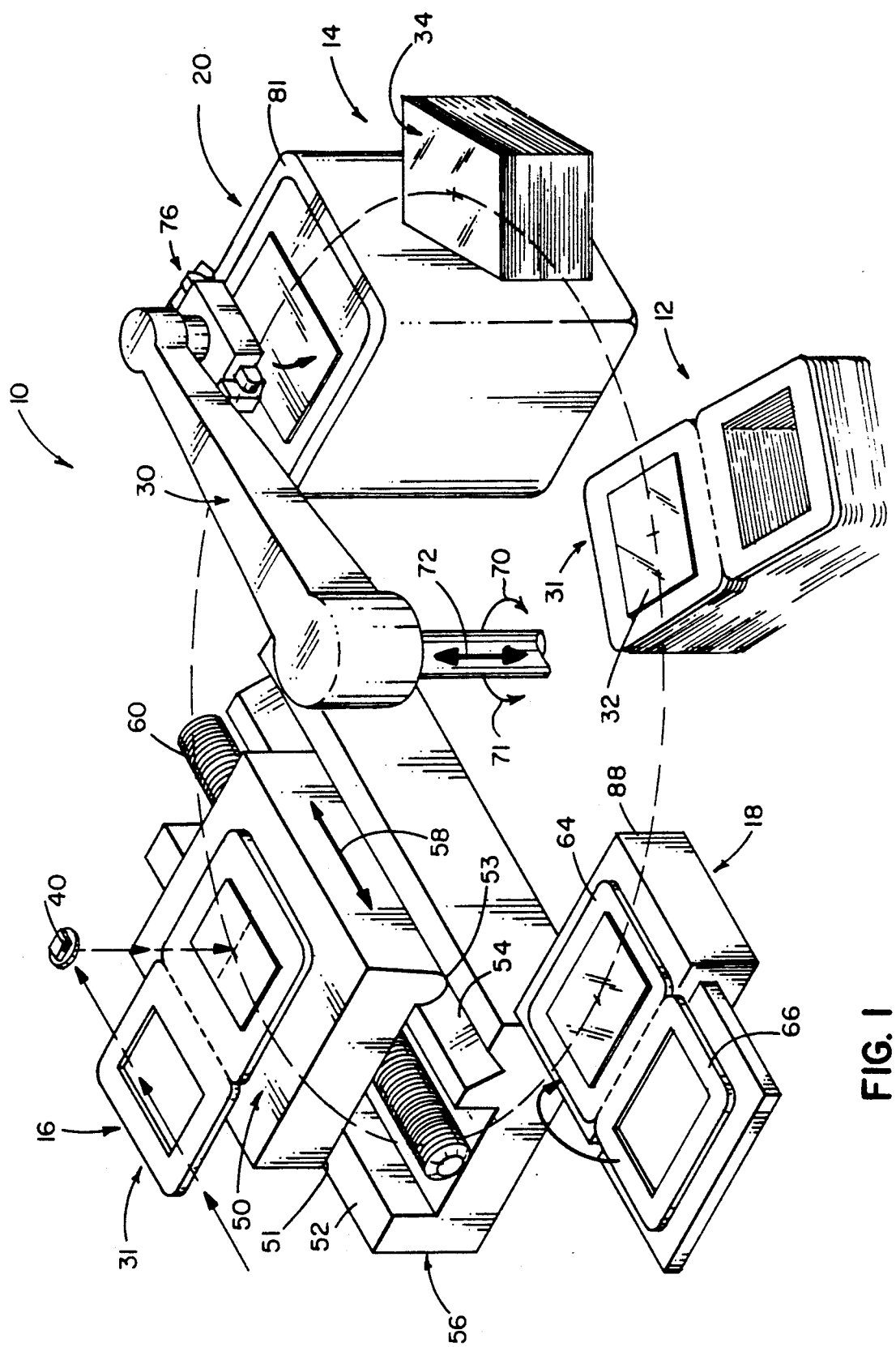
FIG. 1 is a perspective view of the apparatus of the present invention.

With reference to FIG. 1, there is shown apparatus 10 constructed in accordance with the present invention. Apparatus 10 comprises a supply station 12 for open slide frames 31 containing receiver elements 32, a supply station 14 for donor elements 34, an exposure station 16, a fusing, or fixing, station 18, and a waste disposal station 20. A bidirectional rotatable transfer arm 30 is adapted to position a slide frame 31 in exposure station 16 and to then place a donor element 34 in register with the receiver element 32. An image is then scanned onto the donor element 34 by means of a scanner indicated schematically at 40 in FIG. 1.

A suitable scanner for use with the apparatus of the present invention is disclosed in the aforesaid U.S. patent application, Ser. No. 457,593, entitled "Thermal Printer," and the disclosure of this application is expressly incorporated herein by reference. In patent application, Ser. No. 457,593, there is disclosed a scanner (not shown herein) which includes a galvonometer for scanning a laser beam across a donor element in a scan direction. A diode laser, which is modulated in accordance with an information signal, supplies the laser beam to the galvanometer through a collimator lens and beam shaping optics. The beam from the galvonometer passes through an f-$\theta$ lens.

The thermal print medium used in the present invention can be of a type in which a dye is transferred by sublimation from the donor element 34 to the receiver element 32 as a result of heating the dye in the donor.

A thermal print medium of the type which produces a retained image can also be used in apparatus 10. In such a medium, no donor element is used, and a single element contains a dye layer. An image is formed by using the laser beam to remove dye from selected areas on the element.

A thermal print medium which can be used to produce a transferred image in printer 10 can be, for example, a medium disclosed in U.S. Pat. No. 4,833,124, entitled "Process of Increasing the Density of Images Obtained by Thermal Dye Transfer," granted May 23, 1989. This patent is assigned to the assignee of the present invention. As disclosed in U.S. Pat. No. 4,833,124, the thermal print medium includes a donor element having a material which strongly absorbs at the wavelength of the laser. When the donor element is irradiated, this absorbing material converts radiant energy to thermal energy and transfers the heat to the dye in the immediate vicinity, thereby heating the dye to its vaporization temperature for transfer to the receiver element. The absorbing material may be present in a layer beneath the dye or it may be admixed with the dye. The laser beam is modulated by electronic signals, which are representative of the shape and color of the original image, so that each dye is heated to cause volatilization only in those areas in which its presence is required on the receiver element to reconstruct the color of the original object.

Slide frames 31 include a first frame section 64 which includes the receiver element 32 and a second frame section 66. As will be explained in more detail hereinafter, when an image is formed on receiver element 32, section 66 is folded over onto section 64 to form a slide transparency.

In exposure station 16, the slide frame 31 is supported on a movable platen 50. Platen 50 is supported for slidable movement on a base 56. At one side of platen 50, a bottom surface 51 rides on a rail 52, and at an opposite side, an elongated element 53 is supported in a V-shaped groove 54 in the base 56. Platen 50 is advanced in a cross-scan direction, as indicated by arrow 58, by means of a lead screw 60 which is driven by a stepper motor (not shown).

A stack of slide frames 31 are supported at supply station 12, and a stack of donor elements 34 are supported at supply station 14. Any suitable support means can be used for the frames 31 and elements 34, for example, a container (not shown) having a cross section conforming to the shape of the element which it holds.

It is preferable that the support means include some means for maintaining the top element in each stack at a constant height. In a stack of donor elements 34, for use in making a color slide, the donor elements would be arranged in the order of use, for example, a cyan element, a magenta element, a yellow element, and a black element, followed by a cyan element, etc. It would also be possible to have a single stack which contains both slide frames 31 and donor elements 34 arranged in a sequence to produce successive color slides.

Rotatable transfer arm 30 is adapted to position the various elements in the proper sequence to produce a color slide. Arm 30 must be capable of moving the various elements quickly and precisely without damaging the elements. Arm 30 is rotatably driven by means of, for example, a stepper motor (not shown) which is adapted to rotate arm 30 in either of the two directions indicated by arrows 70 and 71. Arm 30 must also be movable in an axial direction as indicated by arrow 72, in order to lift a frame 31 or an element 34 off of a stack and to position the frame or element at a selected station. The axial movement of arm 30 can be provided by any suitable means, for example, a rotatable cam arrangement (not shown) or a hydraulic lifting means (not shown).

Figure 2:
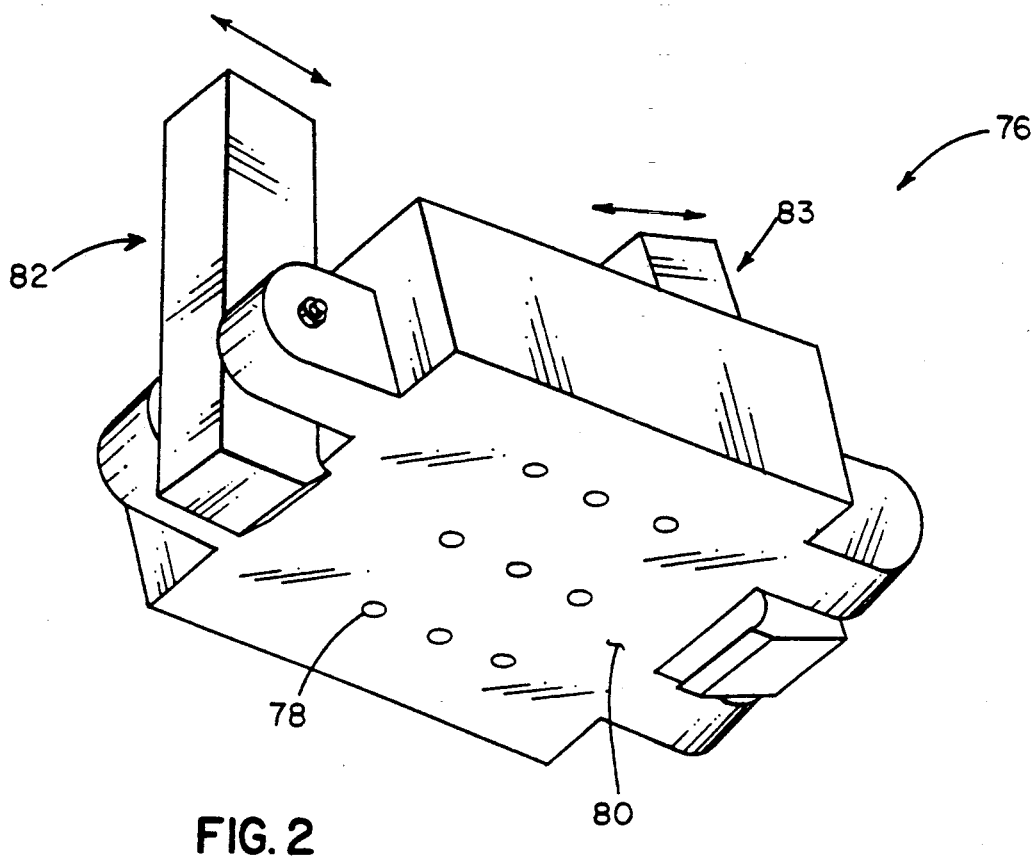
FIG. 2 is a perspective view of the vacuum head used with the rotatable transfer arm.
Figure 3:
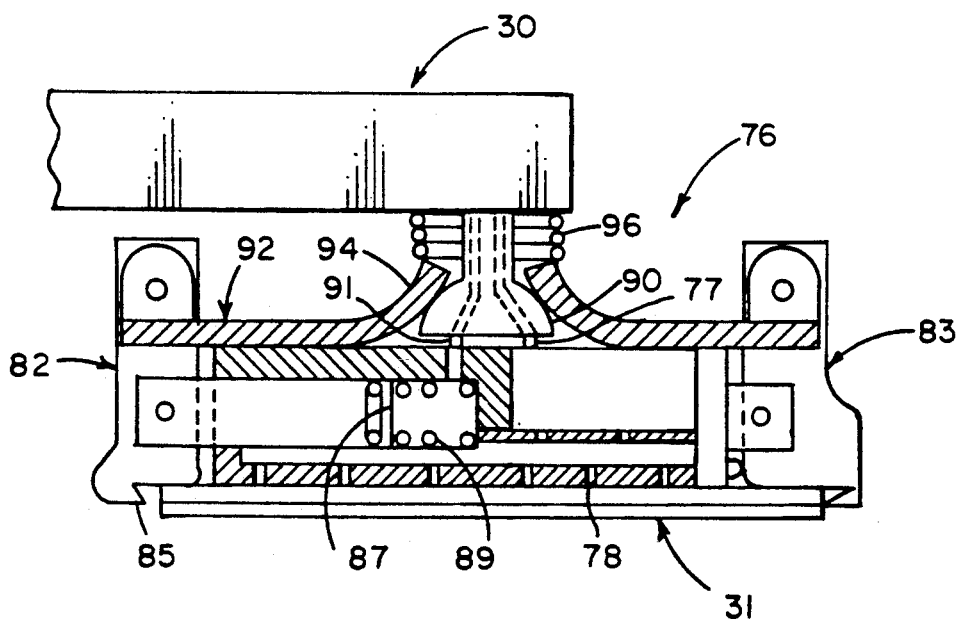
FIG. 3 is an elevational view of the transfer arm and vacuum head, with parts shown in section.

Arm 30 includes a vacuum head 76, as shown in FIGS. 2 and 3. Vacuum head 76 is adapted to pick up frames 31 or donor elements 34 by first means such as vacuum supplied through a line 77 to ports 78 in a face 80 of head 76. Any suitable vacuum supply, for example a vacuum pump and suitable valves, can be used with head 76. Also included on head 76 are second means, such gripper elements 82 and 83 which are adapted to pick up a slide frame 31. Gripper element 83 is in a generally fixed position, and gripper element 82 is movable between an open position, shown in FIG. 3, and a closed position (not shown) in which a finger 85 is moved into contact with frame 31. Finger 85 is moved between the open position and the closed position by means of a vacuum supplied through a line 91 to operate a piston 87. A spring 89 biases piston 87 in a direction to move finger 85 to the open position.

Vacuum head 76 is mounted on a hemispherical element 90 in arm 30. A plate 92 having an upturned portion 94 is supported on element 90, as shown in FIG. 3, and a spring 96 urges the plate 92 against element 90. As a result of this arrangement, head 76 can rotate against the force of spring 96 in order to position a frame 31 against stops (not shown) provided at a work station.

At fusing station 18, heat is applied to an exposed receiver element in order to fix the image therein. Heat is applied, for example, by means of an electrical heating element, not shown, in heating device 88. After the fusing has been completed, frame section 66 is folded over section 64, and the frame sections 66 and 64 are fastened together by, for example, an adhesive. When the adhesive has cured, the slide is ready for use.

In the use of apparatus 10 to form a color slide, arm 30 would first move a slide frame 31 from station 12 to station 16 where the frame 31 is very precisely located against stops (not shown) on platen 50. Arm 30 then moves a first donor element 34, for example, a cyan donor element, into position over the receiver element 32 in frame 31. An image is then scanned onto the surface of the cyan donor element 34 by means of device 40 as the donor and receiver elements are advanced in a cross-scan direction by screw 60. At the completion of the scan, the cyan donor element is removed from the receiver element and it is placed in receptacle 81 at station 20. Next, a magenta donor element is moved into position over receiver element 32, and the operation is repeated. When similar operations have been repeated for the yellow and black donor elements, the full color image will have been formed. Rotatable arm 30 then moves the frame 31 to fusing station 18 where the image is fixed, and the sections of the slide are then cemented together.

Control of the scanner 40 and the various elements in apparatus 10 in the proper sequence can be accomplished in a well known manner by means of a microcomputer (not shown) and appropriate logic circuitry (not shown), as disclosed, for example, in U.S. application Ser. No. 457,593, referenced above.

This invention has been described in detail with particular reference to the preferred embodiment thereof, but it will be understood that variations and modifications can be effected within the spirit and scope of the invention.

We claim:

1. Apparatus for producing thermal slide transparencies, said apparatus comprising:
    a rotatably-mounted transfer arm having means for releasably holding a donor element and means for releasably holding a receiver sheet;
    said transfer arm having first means to first move said receiver element from a first supply station into an exposure position at an exposure station;
    said transfer arm having second means to move a set of donor elements from a second supply station one element at a time into register with said receiver element at said exposure station;
    means at said exposure station for holding said donor element and said receiver element in register, means for supporting said registered receiver element and donor element in said exposure station, means for moving said supporting means and said registered donor element and said receiver element in a cross-scan direction during an exposure of said donor element and said receiver element;
    said second means of said transfer arm further moving each of said donor elements away from said exposure station to a disposal station after the exposure thereof; and
    means for applying heat to said receiver element after the exposure thereof.

2. Apparatus, as defined in claim 1, wherein said first means for releasably holding a receiver element includes a gripper means.

3. Apparatus, as defined in claim 1, wherein said disposal station for receiving used donor elements and said means for applying heat are located on the circumference of a circle.

* * * * *